(12) United States Patent
Sergel et al.

(10) Patent No.: US 6,235,135 B1
(45) Date of Patent: May 22, 2001

(54) PROCESS AND DRUM FOR CONSTRUCTING A GREEN TIRE

(75) Inventors: Horst Sergel; Hans Menell, both of Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/158,495

(22) Filed: Sep. 23, 1998

(30) Foreign Application Priority Data

Sep. 24, 1997 (DE) .............................. 197 42 035

(51) Int. Cl.⁷ ............................ B29D 30/26; B29D 30/30
(52) U.S. Cl. ..................... 156/131; 156/133; 156/135; 156/416; 156/417
(58) Field of Search ................................ 156/111, 126, 156/130.7, 131, 133, 135, 396, 285, 287, 398, 406.2, 414–417, 403, 421.8; 226/95

(56) References Cited

U.S. PATENT DOCUMENTS

| | | |
|---|---|---|
| 3,503,829 | 3/1970 | Menell et al. . |
| 3,630,424 * | 12/1971 | Rau ........................................ 226/95 |
| 4,010,058 | 3/1977 | Kubinski et al. . |
| 4,060,445 | 11/1977 | Houck et al. . |
| 4,504,843 * | 3/1985 | Prohl et al. ............................. 226/95 |
| 4,685,992 * | 8/1987 | Irie ....................................... 156/417 |
| 4,929,298 * | 5/1990 | Van Der Poel et al ............. 156/414 |
| 4,976,804 * | 12/1990 | Kneip .................................... 156/415 |
| 5,073,226 * | 12/1991 | Suzuki et al. ......................... 156/417 |

FOREIGN PATENT DOCUMENTS

| | | |
|---|---|---|
| 1729780 | 2/1972 | (DE) . |
| 2545381 | 3/1982 | (DE) . |
| 396495 | 11/1990 | (EP) . |

OTHER PUBLICATIONS

German abstract of Patent application No. 1 729 780, with English Translation.

* cited by examiner

*Primary Examiner*—Geoffrey L. Knable
(74) *Attorney, Agent, or Firm*—Greenblum & Bernstein, P.L.C.

(57) ABSTRACT

Process and drum for constructing a green tire on a radially expandable drum having a substantially horizontal axis of rotation. The process includes collapsing the radially expandable drum at a minimum first diameter, and positioning a casing on the radially expandable drum to form a drum periphery being composed of an elastic material, and having an inner diameter at least as great as the first diameter, and including a plurality of voids coupled to an evacuating pump. The radially expandable drum is radially expanded from the first diameter to a second diameter greater than the first diameter to expand the casing, and producing a carcass, having at least one carcass ply with at least one of sidewalls and an air-tight inner layer, on the drum. A vacuum is produced in the voids to suction the carcass onto the drum periphery and at least axial end areas of the expandable drum are radially compressed to a third diameter to enable bead cores to traverse the drum periphery without touching the drum periphery. The bead cores are slid over at least the axial end areas of the drum periphery and are axially positioned over the axial end areas of the drum periphery, which are radially expanded at least the axial end areas of the radially expandable drum to a fourth diameter sufficient to radially compress the bead cores and the carcass against each other, providing adequate bonding between a bead core inner surface and a carcass external surface. The fourth diameter is substantially the same as the second diameter, the radially expandable drum is radially compressed to a fifth diameter between the first and second diameters, and the carcass with set bead cores is pulled off the radially expandable drum for further processing in a preshaping device. Upon conclusion of the bead core placement, the carcass is substantially free of compressive stress and tensile stress.

14 Claims, 9 Drawing Sheets

PROCESS AND DRUM FOR CONSTRUCTING A GREEN TIRE

CROSS-REFERENCE TO RELATED APPLICATIONS

The present application claims priority under 35 U.S.C. § 119 of German Patent Application No. 197 42 035.4, filed on Sep. 24, 1997, the disclosure of which is expressly incorporated by reference herein in its entirety.

BACKGROUND OF THE INVENTION

1. Field of the Invention

The present invention is related to a process for constructing a green tire and to an expandable drum on which a green tire is formed.

2. Discussion of Background Information

Generally, bead cores, e.g., Pierce cores for motor vehicles and hexagonal cores for trucks, are produced by devices that are separate from the device for forming a green tire (tire blank). As is known, the filler (or bead fitting profile) is mounted on each bead core on this device.

A carcass is assembled while lying flat on a device having a radially expandable drum with a substantially horizontal axis of rotation and with a thick-walled casing made of rubber or similar material that forms a periphery of the drum that is adequate to balance the compression. As is customary, the carcass assembly is started by applying the sidewalls and/or the substantially air-tight inner liners. Then one or more bead-enforcing profiles, also known as "chafers", are mounted in the usual manner. These chafers can be reinforced with textile or metallic stress supports, which, when used in truck tires, are subjected to a high degree of stress. Then a first and, if necessary, a second carcass ply is applied which generally contains textile and/or metallic stress supports in an axial arrangement.

The bead cores are then slid or guided over the drum and axially positioned. Thereafter, the bead cores and the flat carcass are radially pressed against each other via expansion of the drum. This compression assists the bonding or joining of the inner surfaces of the bead cores to the external surfaces of the carcass.

Then the diameter of the drum is compressed and the carcass with the set bead cores is pulled off the drum, and the cores are conveyed to a preshaping device.

On the preshaping device, the edges of the carcass, i.e., the areas located axially outside the set bead cores, are turned up so that the axially external surface of the respective bead core bond with an axially external surface of the filler, and possibly with the axially external surface of the carcass. If fillers are utilized, they must be installed no later than immediately prior to turning up the carcass. However, as mentioned previously, the fillers are generally applied to the beads immediately after the bead has been produced. Accordingly, preshaping occurs either after or during the turning up of the ends of the carcass ply. The side strips, which are preferably applied at the start of assembly, are knocked upward, after preshaping, by bellows located axially outside of each core.

In many tires, a shoulder cushion profile is arranged between a bottom belt ply and a carcass ply. The existence, shape, and arrangement of these shoulder profiles, as well as whether they are to be mounted to the carcass in a flat or preshaped position do not influence the utility of the present invention.

After turn-up and preshaping, the green tire is completed in a known process, e.g., with belt plies or, if necessary, a band, with sidewalls, and, if necessary, with multilayer tread rubber. However, the number of belt plies, the alignment and mounting of their stress supports, the type of tire, the type and construction of the tread, the sequence of mounting the tread layers and sidewalls, i.e., the manner of completing the tire is not the focus of the present invention.

The sliding of the bead cores over the drum, the axial positioning of the bead cores, and the subsequent radial compression of the bead cores and the carcasses are known as "beading." The present invention is related to the beading process and to the type of compression necessary between prefabricated core and carcasses to achieve the bonding.

A known technique for manufacturing a bond that is free of air bubbles between the carcass and bead cores consists of, rather than manufacturing the cores on a separate device, making the bond directly on the drum via coiling after applying the carcass plies to be mounted to the core setting. However, this process has several disadvantages. In particular, only such cross-sectional forms of bead cores are possible that have an inside running parallel to the drum surface are possible, i.e., no hexagonal core can be utilized unless special measures are taken, and the output of the very costly drum used to construct the green tire, including its peripheral units, such as a servicing unit, a drive unit, a rolling unit, etc., is reduced during the core construction. Thus, utilizing a separate core construction device is much more cost-effective because it requires less space than maintaining additional building drums for green tires to achieve an equal green tire output per production time. Moreover, while it is advantageous to coil the cores immediately after the rubber extrusion of the core wires via the extruder supplying the core wires because the rubber still flows particularly easily and the surface is not threatened by the entry of dust, little space is available for one or more extruders due to the numerous necessary conveyors for a tire building drum.

Another generally utilized technique for core placement includes manufacturing the bead cores, preferably with the filler, with a separate device, and producing the carcass laying flat on a radially expandable drum having a thick walled casing made of rubber or similar material that forms the periphery of the drum and that adequately balances the compression. Thus, the carcass is produced having a diameter smaller than a maximum diameter for the drum.

This smaller drum diameter is selected so that an outside diameter of the carcass is somewhat smaller than an inside diameter of the bead cores to be placed. The ordinarily skilled artisan is familiar with dimensioning a required minimum play between the outside of the carcass and the inside of the core bead to prevent premature contact between the two.

The bead cores may then be slid or guided over the drum and axially positioned. Then, the drum, at least in the axial area in which the bead cores are positioned, is expanded to a diameter so that the outside diameter of the carcass is greater than the inside diameter of the bead cores. Due to this dimensional difference, the bead cores and the carcass are radially pressed against each other. Thus, the compression of these components produces an adequate bonding or joining between the inner surface of the core beads and the outer surface of the carcass, which still lays flat.

The drum may then be compressed to a smaller diameter so that the carcass and set bead cores may be removed from the drum. The carcass may then be forwarded for further processing in a preshaping device. In the preshaping device, the carcass may be centrally wedged underneath the bead cores via expandable rings that are axially movable. A bellow, which may be located in an axial center of the preshaping device and collapsed during conveyance of the carcass to the drum and during the conveyance of the green tire away from the drum, may be inflated to touch the inner wall of the carcass and lift the inner wall between the bead cores.

Then the boundary areas, which are located axially outside the placed bead cores, may be turned up, and the carcass may be preshaped and completed further, e.g., with belt plies and treads, into a green tire.

Tire manufacturers are pressured by their customers, in particular, the original equipment manufacturers, to improve the concentricity, an aspect of tire uniformity, of the tire. In the past, this goal was achieved via measures taken after tire vulcanization. The most well known of these measures being grinding the tread pattern at points that show excessive radial force.

SUMMARY OF THE INVENTION

The present invention improves the concentricity of the tire after vulcanization by improving construction of the unvulcanized green tire.

In accordance with the present invention, prior to applying the first carcass layer, i.e., before the sidewalls or inner liner are applied, the expandable drum may be expanded to a diameter that is greater than a smallest diameter set during the process. Further, prior to sliding the bead cores over the drum, the drum, at least in an axial area or areas that the bead cores are guided over and positioned around, and preferably across its entire axial length, is radially compressed to a diameter that is smaller than the diameter utilized for applying the carcass components. Voids or grooves may be arranged in the periphery of the drum and these grooves may be coupled to an evacuating pump so that, prior to the radial compression of the drum to a smaller diameter, a vacuum of at least approximately 30%, and preferably between approximately 55%–80%, may be created and maintained at least until completion of the positioning of the bead cores. In this manner, the carcass remains substantially wave-free and smooth on the shrinking drum periphery, and the outside diameter of the still-flat carcass is reduced so that the bead cores can be guided over and positioned around the carcass without touching it.

The present invention includes features that are known in the art and features devised by the inventors of the present invention, however, in accordance with the present invention, the processing sequence of even the known features may be different. Assuming the separate production of bead core and carcass until the setting of the bead cores, using corresponding special devices, the known process provides compressing the bead cores and the carcass until they are bonded or joined together. Assuming that the voids in the periphery of the drum are coupled to an evacuating pump, in accordance with the features of the present invention, which requires a device not known in the prior art, the sequence of the process becomes, e.g., expanding the expandable drum prior to applying the first carcass layer to a diameter D3, which is greater than the smallest diameter D2 to be utilized during the set process; creating a minimum vacuum of 30% in the voids and maintaining the vacuum until the bead cores are positioned; radially compressing the at least the axial end areas or the entire axial extent of the drum to a diameter D4, which is smaller than D3, to enable the bead cores to be axially moved and positioned over either the axial end areas or the entire axial extent of the drum; moving and axially positioning the bead cores over the drum; compressing the carcass and the bead cores to provide sufficient bonding between the carcass and the bead cores; and radially compressing the drum to a diameter D6 to enable the carcass and set bead cores to be pulled off the drum for further processing in a preshaping device.

With regard to the device of the present invention, the voids are arranged in the periphery of the drum in a manner so that they may be evacuated. These voids are provided as, e.g., a system of grooves that converge at a few locations, which are referred to as "gullies." The gullies may be coupled to an evacuating pump via a channel that extends radially through the drum periphery toward the inside of the drum.

The voids may also be formed via a large number of sack voids, which would be evacuated via a more extensively branched channel system by an evacuating pump positioned within the drum, and preferably via a buffering reservoir. The void-to-void spacing around the circumference of the drum should be sufficiently small in proportion to a bending resistance of the carcass in a raw state, so that the carcass does not flatten during the compression of the drum to a smaller diameter due to residual compressive stresses.

The production of the blank (green tire) begins by expanding the drum, e.g., evenly over its entire axial length. Then the first layer of the carcass is applied, which, depending on the design, usually includes a sidewall on the left and sidewall on the right, an inner liner, or a brace composed of these three individual components. After this, the other carcass layers, if necessary, are applied, e.g., an additional carcass ply, up to the last layer prior to setting the bead cores. In this regard, it is noted that any layer that contains stress supports composed generally of textile yarns or steel wire strands in a cord arrangement is referred to as a ply.

Then, a vacuum of at least approximately 30% is produced in the voids. With an ambient pressure of approximately 1 bar, a minimum vacuum of approximately 30% would be a minimum pressure of at least approximately 0.3 bar in the voids with respect to the surrounding area. Thus, the absolute pressure would be a maximum of approximately 0.7 bar.

Due to the generation of the vacuum in the voids, the carcass may be suctioned in by the drum periphery so as to fix its position. Of course, it is also possible to build up the vacuum even earlier. However, this embodiment would be inferior due to the unnecessarily high amount of operating time and energy consumption that would be required by the evacuating pump.

Because of the large number of suctioning voids, the minimum pressure can be designed to be particularly weak. Further, with gullies being arranged along two axially-spaced peripheral lines and with, e.g., 6 gullies per peripheral line, it has proven advantageous if substantially axially extending grooves run into each gully. Even with a 60% vacuum, which can be achieved at a very low cost, this type of void arrangement can produce excellent results.

After the described vacuum has been attained and while it is being maintained, the drum is radially compressed to a smaller diameter sufficient so that the prefabricated bead cores can be moved in a contact-free manner across the carcass, which is being radially compressed with the drum periphery.

If the bead core to be positioned on the left were to be slid across from the left side of the drum, and the bead core to be positioned on the right were to be slid over the drum from the right side, then it would be sufficient to compress the drum only in the two axial end areas of the drum where the positioning of the bead cores is intended. In this manner, it would not be necessary to slide the bead cores over the center of the drum.

Because it would be too expensive to sometimes hold the drum on the right side and sometimes on the left side, i.e., with a wrap-around, so as to shorten the bead core conveyance across the carcass, the bead core may be moved into a holding position on the bearing side of the drum prior to applying the first carcass ply. The bead core may be held in a position that is even closer to the drum bearing than the edge of the carcass plies facing the drum bearing.

To avoid such an expenditure and to avoid additional segmentation of the drum, the diameter modifications of the drum, in accordance with the present invention, occur over the entire axial length of the drum, even if the bead core will not be guided over the center section of the carcass, as discussed above.

As is known, the drum may include a plurality of sections or segments, e.g., 12 or 24 segments, made substantially of metal, e.g., aluminum. These segments are normally interconnected to a mechanism that controls the expansion and compression of the drum diameter. In particular, each segment radially moves by a same measure as the other segments so that none of the segments move independently from each other. In this manner, a set drum radii is established and the drum center remains unchanged.

A thick-walled casing made of, e.g., rubber or a similar type material, may be pulled across the metal segments. The outside of the casing forms the drum periphery. The casing bridges the narrow gaps that inevitably occur during the radial extension of the segments, so that the drum periphery remains substantially circular, even when the segments are extended. The wall thickness of the casing may be dimensioned as a function of a width of the gap to be bridged at a maximum extension of the segments, of the hardness of the material to be used for the casing, and of the sharpness of the inner contour of the raw carcass that is required to be free from bulges. In an exemplary embodiment of the present invention, a wall thickness of the casing may be, e.g., approximately 2 cm.

According to the present invention, the surface of the casing (also referred to as collar) is provided with the above-mentioned suctioning voids, which are utilized for executing the process of the present invention and for fixing the carcass on the casing.

The drum should be compressible to a diameter that is even less than necessary for moving and positioning the prefabricated core beads over the carcass. The casing may be mounted on the segments in this fully contracted state. While moving and positioning the core beads, the drum is less compressed, i.e., has a larger diameter, than when the casing was mounted. In this manner, while the bead cores are being moved over the carcass, the casing is under enough internal tensile stress resulting from its elastic expansion, to maintain contact with the segments. Otherwise, it would be necessary to attach the casing to the segments, e.g., with glue or screws, to ensure that the casing does not lift up or away from the segments. In an alternative embodiment of the present invention, contact may be ensured between the casing and the segments by placing suctioning voids not only on the outer surface or periphery of the drum, but also on the inner surface of the casing or the periphery of the metal segments of the drum.

In a compressing state of the drum in which carcass is smoothly-attached, and radially-contracted by the vacuum, the bead cores are placed over the drum in the correct position. In this manner, contact between the drum periphery and the inside of the bead cores is avoided during the positioning of the bead cores.

The drum is then expanded to a diameter that is, e.g., substantially the same as the diameter when the carcass was constructed. During this part of the process, the bead cores are subjected to pressure, while the carcass, which is particularly sensitive to compressive stress due to its raw state, is substantially free of tension as compared to the known processes.

The change in diameter of the drum is balanced with the inner diameter of the bead core so that the prefabricated bead cores and the still flat carcass are, via the drum expansion, radially compressed against each other in such an intensity as is required to achieve bonding.

After having achieved the bonding between the bead cores and the carcass, the drum is again brought to a smaller diameter, and the carcass, now including the set bead cores may be pulled off the drum and forwarded to a preshaping device.

The present invention is based on the newly acquired knowledge that the carcass, while being moved to the preshaping device and while resting on the preshaping device prior to preshaping, sags due to gravity. This effect is observed particularly with radial carcasses to which the present invention is related because of the substantially axial stress supports. Thus, in the central area of the axis, the carcass at the top lies closer to the axis of rotation than at the carcass as the bottom.

This sagging due to gravity causes, as the inventors of the present invention discovered, a systematic error mechanism in the known processes. To understand this mechanism, the behavior of the carcass was considered theoretically, i.e., based on the assumption that the tire is produced in weightlessness and with other random errors excluded, and then analyzed the effects of the still-influential gravitational force theoretically. In this manner, a hypothesis was established for differentiating between various causalities.

When conveying the carcass that is bonded with the bead cores from the building drum to the preshaping device, a restoring force of the expanded rubber is released, due to the carcass expansion upon the bead inside diameter which is undertaken within the bead area, because the building drum now lacks the previous expanding force. The carcass expansion is countered by a tensile force of the rubber that runs in the peripheral direction and that is caused by the previous expansion of the rubber. This tensile force of the rubber has an effect similar to that of a corset, i.e., it restricts.

This effect, due to some shape memory of rubber in its raw state, can also be called "restoring," in that it attempts, where possible, i.e., between the bead cores, to bring the carcass into the shape it held prior to expansion, i.e., the shape when it was underneath the bead cores prior to compression with the bead cores. As a result of this effect, the stress supports of the carcass, e.g., usually thin, steel ropes in truck tires, natural and/or chemically-produced textile yarns in bicycle, motorcycle and motor vehicle tires, run U-shaped between the bead cores, while their minimum distance to the axis of rotation respectively lies in the center between the two bead cores. The depression of all stress supports thus points to the axis of rotation.

The form of the carcass, derived above theoretically, is actually subjected to gravitational force such that the axis of rotation of the building drum is located horizontally in the space. Gravity also produces a sagging of the stress supports downward. The depression caused for the top stress support hereby points to the axis of rotation, but only with respect to the upper stress support. For the randomly taken second example, the bottom stress support points away from the axis of rotation. In the upper drum half, most strongly at its very top, the two deformations of the stress supports interact increasingly, whereas in the bottom half, most strongly at its very bottom, both deformations interact decreasingly. If the bead cores were able to freely adjust to each other, they would assume a wobbling position to each other, i.e., a position in which a distance between the bead cores at the top would have a smaller distance that between the bead cores at the bottom.

However, gravity also has an effect on the bead cores, which are relatively heavy. As a result, the bead cores resist the above-noted tumbling position and, during moving of the carcass, they assume an almost vertical, and thus substantially coaxial, positioning with toward each other. In reaction to this, a stronger tensile stress arises in the stress supports of the upper drum half, most strongly in those supports positioned at the very top of the upper half of the drum, in comparison to the stress supports of the lower drum half, most strongly in those supports positioned at the very bottom of the lower drum half.

The repelling force is dependent upon the elasticity of the rubber, which is not yet vulcanized, and the rubber also exhibits a distinct plasticity or ductility. Accordingly, the restoring effect becomes weaker with time and the bracing of the stress supports, insofar as they are subjected to tensile force, diminishes at the bead core over time because this bracing is nothing more than an adhesion of the rubber located between core and stress support which is subjected to shear. While the carcass includes an area with an amount of "give", a stress support subjected to tensile force may be gradually pulled through underneath the bead core, which pulling is as fast as the tensile stress in the stress supports is strong. Notwithstanding when the flow process underneath the core is interrupted by the subsequent tire construction and ultimately the vulcanization, it has appeared up to now that the stress supports of the upper tire half were pulled through underneath the core by a larger amount than the lower ones, which was also mistakenly thought to be a greater expansion of the stress support. Consequently, the final product thus produced included at the top a greater stress support length from core to core and, therefore, a larger rolling radius than at the bottom.

That part of the ready vulcanized tire, that was previously, namely in its raw state, located in a down position on that device which stores and moves the carcass from the building drum to the preshaping apparatus, shows a minimum of radial force and that part of the ready vulcanized tire, that was, in its raw state, located in an up-position on the device storing and moving the carcass, shows a maximum of radial force. According to the new findings of the inventors, a plot of the radial forces in a Fourier analysis exhibits a first harmonic not only with a random component being unreproducible but also with a systematic component being reproducible, and avoidable by the present invention, whereby this systematic component correlates to the former positioning of the green carcass on the storing and moving device.

An important hurdle was to depart from the old idea that the stress supports would be expanded differently above and below. It was only possible to refute this old idea by analyzing the lengths of the turn-up in the course of which it was discovered that, in places where the stress supports apparently were expanded between the cores, the lengths of the turn-up were slightly shorter in the finished product.

However, even this analysis did not lead directly to the solution, since ultimately, gravity cannot be excluded.

In keeping with the discovered causation, providing the building drum and the preshaping device with vertical, rather than horizontal, axes of rotation appeared very promising at first, so that the carcass blanks could have been conveyed with a vertical arrangement of the axis of rotation and, if necessary, stored temporarily. However, this idea had to be rejected because the previous carcass mounting, as well as the subsequent belt construction, only appears to be practicable with the conventional horizontal arrangement of the axis of rotation of the drums that, due to the otherwise difficult conveyance of the various plies to be applied, assist in the construction of the axis.

Moreover, during this considered and rejected mounting with a vertical axis, at least on that side of the green carcass which would be located above, the sidewall, as being a rubber strip without stress supports for the lateral covering of the carcass ply, must not be yet attached because this sidewall might fall unintentionally onto the carcass ply.

Contrary to the foregoing, the present invention eliminates the restoring effect by the following: subjecting the carcass to a deforming constraint at most under the bead cores and not to a constraint between the bead cores which would result in an after-effect; reducing dramatically the time period during which this constraint, according to the present invention by compression not expansion, is applied, whereby this constraint shows nearly no variations during this short time period excluding a lot of randomness; and terminating that constraint prior to releasing the carcass from the building drum by contracting the drum. These synergistic characteristics of the process of the present invention has resulted in significant improvement of concentricity of tires produced according to the present invention.

Preferably, the smooth compression of the carcass to enable the sliding over and positioning the bead cores occurs prior to the sliding-over and positioning of the bead cores, and the subsequent compression of the bead cores and carcass via drum expansion occurs immediately after the positioning of the bead cores. The drum diameter during the compression of the bead cores and the carcass may be substantially the same as the diameter at which the carcass was initially constructed on the drum. In this manner, the desired effect is greatest, i.e., that the sensitive internal rigidity of the still-raw carcass is distorted to a lesser extent, so that practically no more distortion appears at all.

As a result of the reduction in distortion, which may be even further reduced if the time selected between removing the carcass from the building drum and preshaping is very short, e.g., less than approximately 30 seconds, sagging of the carcass while being conveyed to the preshaping device, also called a preshaping head and while remaining in an uninflated condition on the horizontal axis of rotation of the preshaping device, may be reduced considerably. Thus, the carcass acts stiffer.

For this reason, the preshaping bellows attaches practically simultaneously at the top and bottom of the inside of the carcass to be inflated (i.e., preshaped or cambered). The remaining system defect caused by the influence of gravity is clearly smaller than the random defects.

In its exemplary embodiment, the present invention, upon completion of the core mounting, provides a carcass that is not expanded beyond its stress-free mounting diameter, but is decompressed, i.e., released from its intermediate, temporary residual compressive stress to attain a substantially stress-free state.

A great improvement in concentricity characteristics may be observed independent of whether the vulcanization is performed with or without bellows. Moreover, since at least longwave random errors appear to be smaller with bellowless vulcanization, an even better concentricity tends to result during bellowless vulcanization.

Prior to present invention, in which the carcass is temporarily substantially compressed to the drum periphery to substantially avoid bulges and creases, magnetic fixing was utilized for tires with steel core carcass that are used on heavy trucks. Taking into consideration not only costs and operating safety, but also personal safety, the magnetic fixing is possible, in principle, but is clearly not as effective as the preferred suction for fixing the carcass onto the drum.

In accordance with the present invention, an expandable drum is provided and utilized. The expandable drum includes a rubber or similar type material casing to form a drum periphery. According to the device of the present invention, the casing of the drum includes voids on its outside.

To avoid necessitating a build up of excess pressure from the outside, which would require the admission of a larger volume and result in air-tightness problems, a vacuum may be applied from, e.g., the inside of the drum. In this regard, the voids of the drum may be coupled to an evacuating pump.

Accordingly, the present invention is directed to a process for constructing a green tire on a radially expandable drum having a substantially horizontal axis of rotation. The process includes collapsing the radially expandable drum to a minimum first diameter, and positioning a casing on the radially expandable drum to form a drum periphery, the casing being composed of rubber or a similar material having wall thickness to equalize compression, having an inner diameter at least as great as the first diameter, and including a plurality of voids coupled to an evacuating pump.

The process further includes radially expanding the radially expandable drum from the first diameter to a second diameter greater than the first diameter to expand the casing, and producing a carcass on the drum periphery, the carcass comprising at least one of sidewalls and an air-tight inner layer, and further comprising at least one carcass ply. Preferably, the second diameter is greater than the first diameter.

A vacuum is produced in the voids to suction the carcass onto the drum periphery and at least axial end areas of the expandable drum are radially compressed to a third diameter to enable bead cores to traverse the drum periphery without touching the drum periphery. Preferably, the third diameter is greater than the first diameter and less than the second diameter. Preferably, the fifth diameter is greater than the first diameter and less than the second diameter.

The process further includes sliding the bead cores over at least the axial end areas of the drum periphery and axially positioning the bead cores over the axial end areas of the drum periphery, radially expanding at least the axial end areas of the radially expandable drum to a fourth diameter sufficient to radially compress the bead cores and the carcass against each to provide adequate bonding between an inner surface of the bead cores and an external surface of the carcass, the fourth diameter being substantially the same as the second diameter, radially compressing the radially expandable drum to a fifth diameter that is between the first and second diameters, and pulling the carcass with set bead cores off the radially expandable drum for further processing in a preshaping device. Upon conclusion of the bead core placement, the carcass is substantially free of compressive stress and tensile stress.

In accordance with another feature of the present invention, the axial end areas of the drum periphery extend from the axially external drum edge to an internal axial side of the bead core.

In accordance with another feature of the present invention, the entire expandable drum is compressed and expanded with the compression and expansion of the axial end areas of the drum periphery.

In accordance with still another feature of the present invention, the produced vacuum in the voids is a minimum of an approximately 30% vacuum. Further, the produced vacuum in the voids is between approximately a 55% and 80% vacuum.

In accordance with a further feature of the present invention, the vacuum produced in the voids is sufficient to suction the carcass onto the expandable drum such that, during subsequent compression of the drum diameter, the carcass is held substantially free of wrinkles and waves.

In accordance with a still further feature of the present invention, after positioning the casing on the expandable drum, expanding the expandable drum to a sixth diameter that is less than an inner diameter of the bead cores, sliding the bead cores from a free end of the expandable drum and over the expandable drum to a bearing end of the expandable drum, and storing the bead cores for at least the axial end adjacent to the bearing end until the bead cores are to be axially moved and positioned.

In accordance with another feature of the present invention, the fifth and sixth diameters are substantially the same.

In accordance with still another feature of the present invention, the bead cores are prefabricated prior to the construction process for the green tire.

In accordance with a further feature of the present invention, the bead cores are composed of one of Pierce cores for a motor vehicle tire and hexagonal cores for a truck tire.

The present invention is also directed to an expandable drum for constructing a green tire that includes a casing forming a drum periphery having a plurality of voids formed on the drum periphery and an evacuating pump coupled to the plurality of voids.

In accordance with another feature of the present invention, the voids include a network of grooves coupled to a plurality of gullies, and the gullies are coupled to the evacuating pump, which is adapted to create a vacuum in the grooves. Further, the grooves have a width and a depth of approximately 3% of a drum diameter.

In accordance with still another feature of the present invention, the grooves are arranged substantially axially along the drum periphery. Further, a peripherally arranged groove is positioned at each end of the drum periphery, the peripherally arranged groove is coupled to each of the substantially axially arranged grooves. Still further, the gullies are arranged in two peripherally positioned rows and each gully is coupled to an adjacent gully in the peripheral direction. Further still, adjacent gullies in different peripherally positioned rows are coupled by the substantially axially arranged grooves.

The present invention is also directed to a process for producing a green tire on an expandable drum having a drum periphery with a plurality of grooves formed therein. The process includes forming a carcass on the drum periphery, creating a vacuum in the plurality of grooves to suction the carcass onto the drum periphery, and compressing, while the carcass is being suctioned to the drum periphery, at least the ends of the drum periphery to a diameter sufficient to enable the bead cores to traverse at least the ends of the carcass without touching the carcass.

In accordance with another feature of the present invention, the compressing of at least the ends of the drum periphery includes compressing the entire drum periphery to a diameter sufficient to enable the bead cores to traverse at least the ends of the carcass without touching the carcass.

In accordance with yet another feature of the present invention, the compressing of at least the ends of the drum periphery includes compressing the entire drum periphery to a diameter sufficient to enable the bead cores to traverse the entire carcass without touching the carcass.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
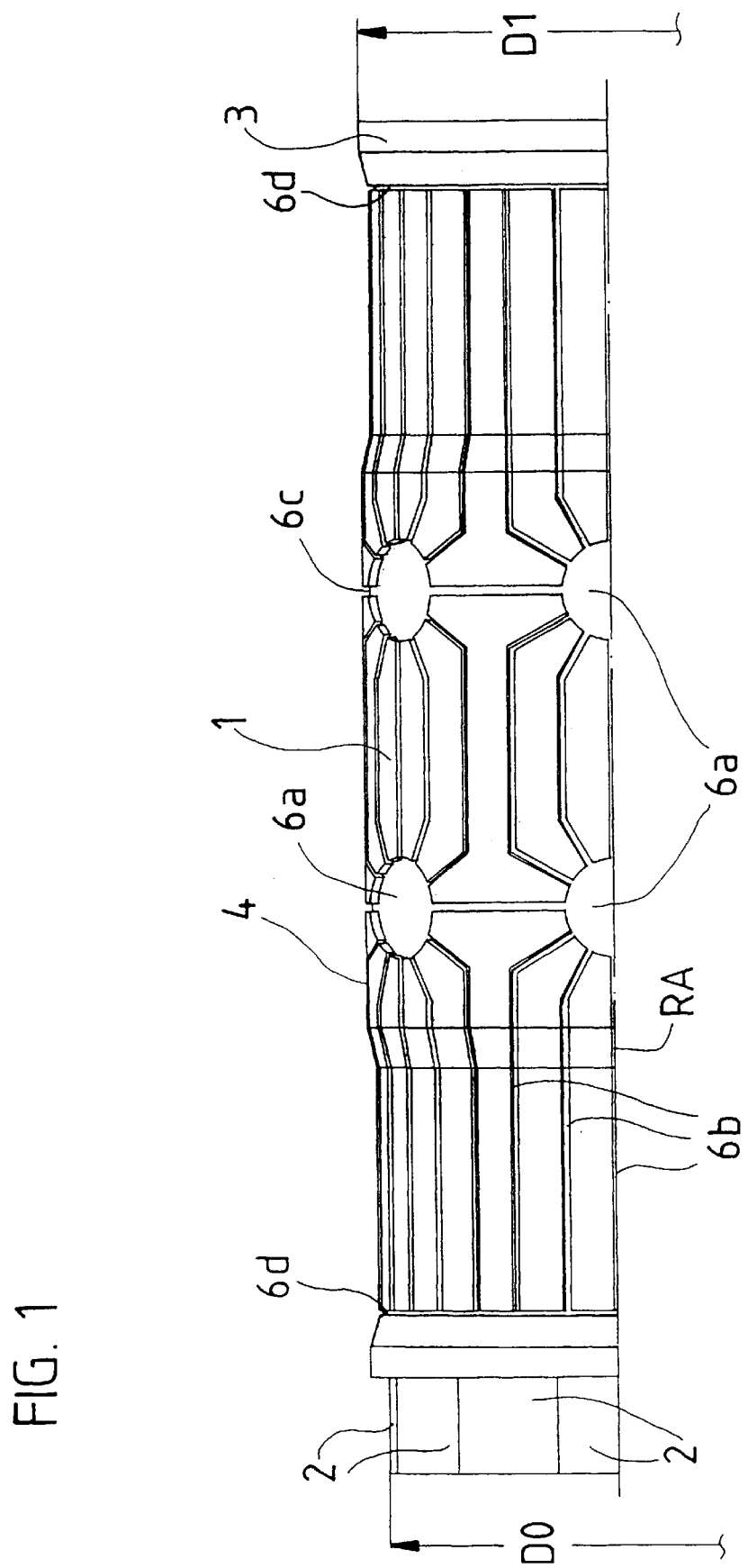
FIG. 1 illustrates a view of a top half of a building drum in accordance with the present invention during the mounting of a casing during which the drum is contracted.

FIG. 1 illustrates a view of the top half of a building drum 1 that includes a plurality of, e.g., twelve, metal segments 2. In accordance with this exemplary embodiment, building drum 1 is placed in a contracted or collapsed state to enable a casing 3 to be placed over building drum 1. Casing 3 may be made of, e.g., rubber or other similar type casing material, and the casing may be placed over building drum 1, e.g., by sliding casing 3 over the contracted building drum 1. In the illustrated example, it is assumed that a drum bearing (not shown) is located on a left-hand side of building drum 1, and that casing 3 is placed over building drum 1 in a direction from right to left.

Further, building drum 1 also includes a horizontally-arranged axis of rotation RA, which is also an axis of symmetry. Accordingly, the bottom half of building drum 1 is not depicted here.

The diameter of building drum 1, which is measured over metal segments 2, is represented by D0. The outside diameter of casing 3, which is illustrated in its unstressed or unexpanded state, is represented by D1. In order to provide a small amount of play between casing 3 and metal segments 2 to facilitate the mounting or sliding on of casing 3, D1 may be, e.g., larger than D0 by at least double a wall thickness of casing 3.

On its outer contour or surface, casing 3 includes a system of voids or openings 6. In the exemplary embodiment, voids 6 may be arranged into two peripheral tracks, each track including six "gullies" 6a and ten substantially axial grooves 6b may be coupled to each gully 6a. Further, two peripheral grooves 6c may be provided between gullies 6a arranged adjacent to each other in the circumferential direction. At the two external axial edges, a groove 6d extends in the peripheral direction and is coupled all grooves 6b. In this manner, a network of grooves 6 is formed on drum periphery 4. This network of voids is utilized to suction the carcass in a later stage of the process of the present invention.

Voids 6 may be provided with a width and depth that are, e.g., approximately 3% of the drum diameter. If the cross-sectional area of the grooves 6 is dimensioned too small, the resulting suctioning effect will not sufficient, i.e., the suctioning force will build up rather slowly and will be effective against infrequently occuring minor leakages. For clarity, only the size of the gullies 6a is somewhat exaggerated with respect to the other depicted elements in this illustration.

Figure 2:
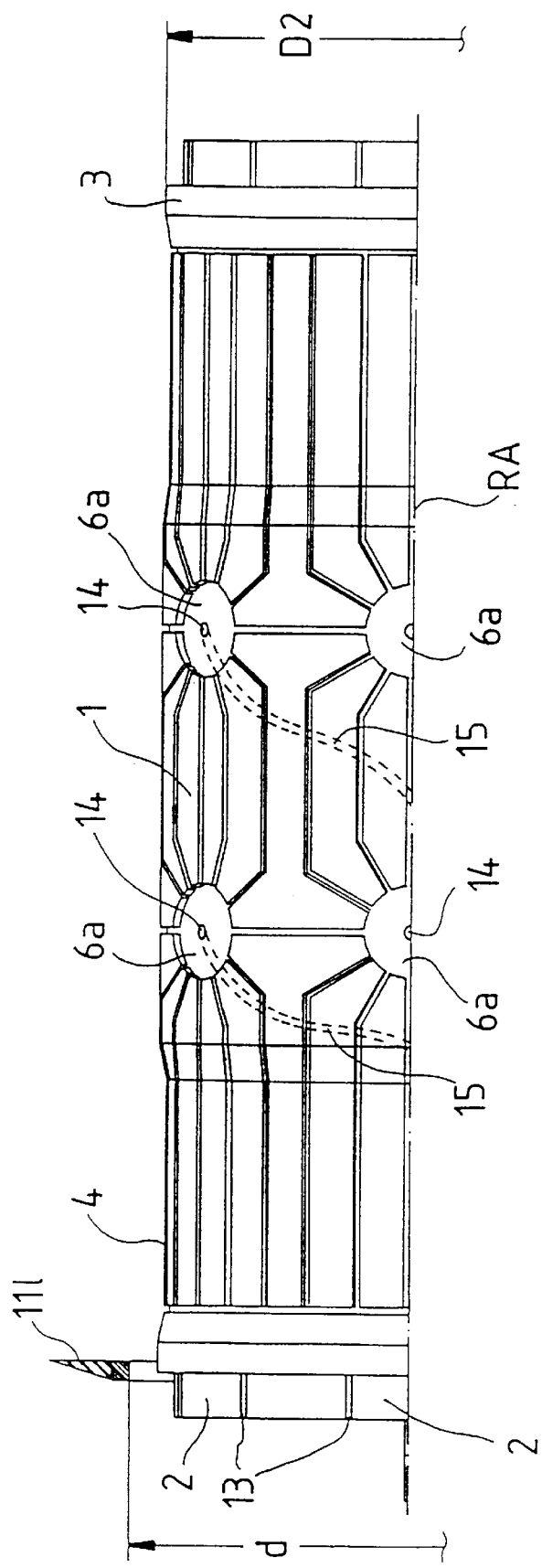
FIG. 2 illustrates a view of the top half of the building drum after a casing has been placed thereon and the drum has been expanded to a diameter D2.

FIG. 2 illustrates a view of the top half of building drum 1 after casing 3 has been mounted and the drum is expanded to provide an outside diameter of casing 3 with a diameter represented by D2. At this point, casing 3 becomes a essentially functional component of building drum 1 such that the external surface of casing 3 forms the periphery 4 of drum 1. Casing 3 bridges or spans gaps 13 that form between adjacent metal segments 2 as the diameter of drum 1 expands.

Once the casing 3 is mounted, it is suitable for building up about 1,500 carcasses using the present inventive process. The casing 3 has to be replaced
  when elastic contracting force of the casing 3 becomes too
    weak to prevent separation from the metal segments
    during suctioning in those stages of the process shown
    in FIGS. 5, 6 and 8 and preferably 7,
  or when leakages become too great.

Thus, remounting of the rubber sleeve or "casing" according to the present invention is a rather rare occurrence. Where such a remounting is not necessary—which is the normal case—the inventive process need not begin with FIG. 1 and the drum diameter D1 but with the following FIG. 2 and the drum diameter D2.

Because of prestressing achieved due to elastic expansion of casing 3 from D1 to D2, casing 3 does not lift off metal segments 2 of drum 1, even if a radially outwardly directed force is exerted on casing 3. For this reason, the difference between D1 and D2 is relatively large. Avoiding lifting off of casing 3 by expanding the diameter of building drum 1 enables the carcass of the present invention, which is compressible in the peripheral direction, to be reduced, such that the diameter of the carcass can be reduced to a diameter D4, which is smaller than diameter D3 for building the carcass, and which is substantially similar to D2.

Casing 3 is positioned on building drum 1 not only axially, but is also positioned in its peripheral direction so that each gully 6a is positioned over a connecting (or transition) hole 14 located in a metal segment 2 of building drum 1. Each connecting hole 14 may be coupled, e.g., via flexible tube lines 15, with an evacuating pump or a joint pump. Therefore, in an arrangement utilizing twelve segments 2 and six gullies, every other metal segment 2 includes two connecting holes 14 axially spaced from each other at a distance corresponding to the axial distance between gullies.

During the production of a tire series, drum diameter D2 is the smallest diameter that will be utilized for construction, i.e., while diameter D1 may be smaller than D2, diameter D1 is utilized only for purposes of control and repair.

At this point in the process, it may be advantageous to position the left side bead core 11l in an intermediate storage area in the vicinity of drum bearing, which has been assumed to be positioned on the left side (not shown), e.g., by moving the bead core over casing 3 from right to left. The intermediate storage area may be positioned, e.g., between the right edge of the drum bearing and the left edge of the carcass to be constructed.

Figure 3:
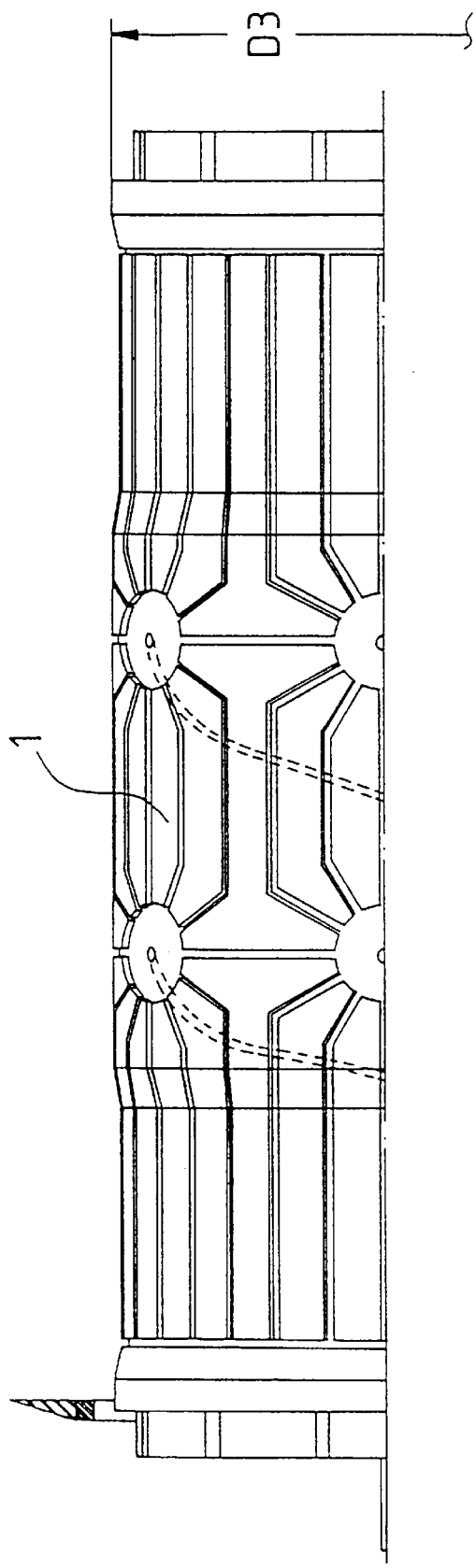
FIG. 3 illustrates a view of the top half of the building drum expanded to a diameter D3 for initiating construction of the carcass.

FIG. 3 illustrates a view of the top half of building drum 1 that has been expanded to a diameter represented by D3 so that construction of the carcass may begin.

Figure 4:
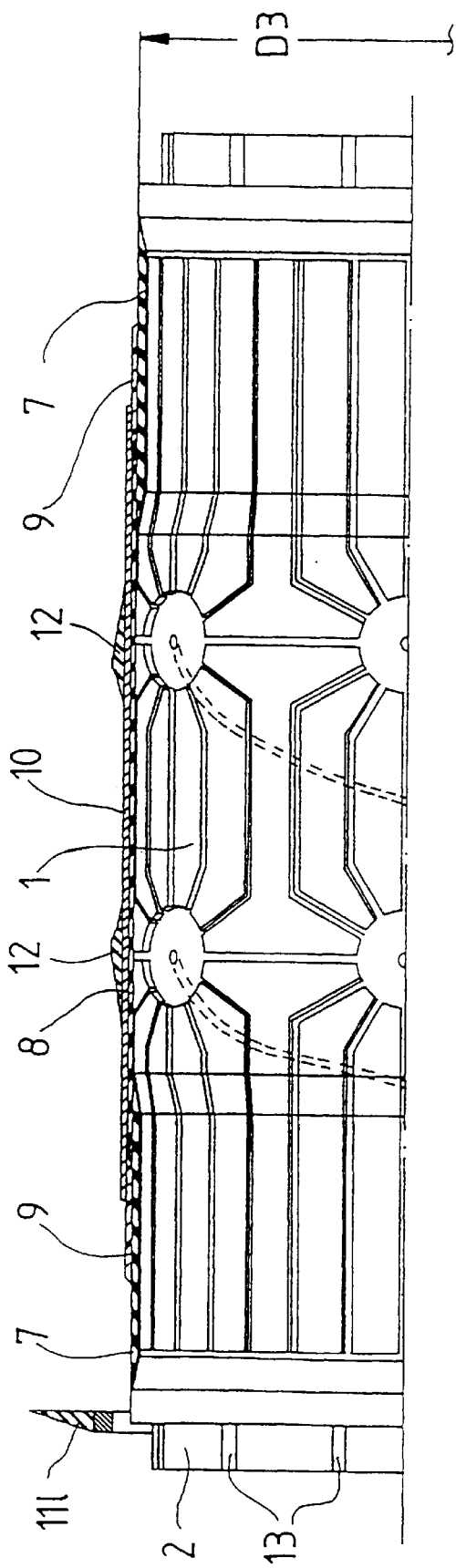
FIG. 4 illustrates a view similar to that depicted in FIG. 3 after the application of the initially-mounted tire components, such as sidewalls, inner liners, a chafer in the future bead area, a carcass ply, and shoulder cushion profiles.

Once expanded to diameter D3, the construction or manufacture of the green tire starts by applying sidewalls 7 (see FIG. 4).

FIG. 4 illustrates a view similar to that depicted in FIG. 3 after the first tire components have been applied. Strips 7, made of, e.g., rubber or other similar type material, may be provided with, e.g., a substantially trapezoidal cross-section. These strips 7 are generally referred to as sidewalls.

As shown in the figure, strips 7 are positioned beneath the sides of carcass ply 10 located opposite the air gap in the areas between the bead cores and the tread. The technical terminology used by production engineers generally differs slightly from that of many engineers who refer to the entire area between the bead core and crown, i.e., including the corresponding area of carcass ply 10, the sidewall.

In the subsequent figures, all applied tire components are illustrated in cross-section, and building drum 1 is depicted, as in the previous figures, showing the peripheral surface of drum 1 (i.e., casing 3).

After applying strips 7, an inner liner 8, made of, a butyl-rubber mixture, and a chafer 9 may be applied in the area in which the bead cores will be applied. Further, a plurality of chafers 9 may be utilized in a manner apparent to the ordinarily skilled artisan.

Carcass ply 10 may now be applied onto the drum in the manner shown in FIG. 4. For passenger car tires, carcasses may generally additionally include textile stress supports, and for truck tires, the carcasses may generally additionally include cables of steel wire. The supports or wire may be substantially axially positioned with the cord ply so that the stress supports are substantially parallel to each other without crossing stress supports.

Shoulder cushion profiles 12 may be applied over carcass ply 10. In the completed tire, shoulder inflation profiles 12 are utilized to conform, even at the edges, a flat cross-sectional contour of the belt with a carcass contour which already is preshaped more strongly at the belt edges.

Figure 5:
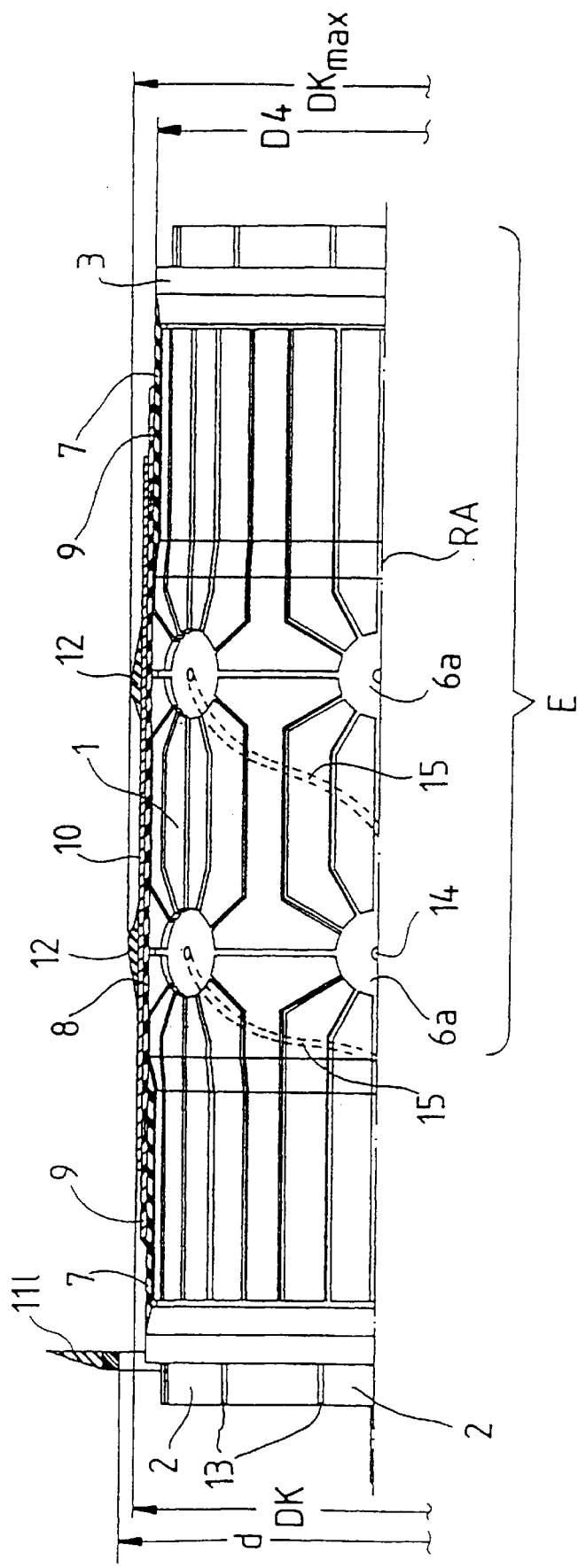
FIG. 5 illustrates a view similar to that depicted in FIG. 4 after contraction of the drum to a smaller diameter.

FIG. 5 illustrates a view similar to that depicted in FIG. 4 after compression of drum 1 to a smaller diameter represented by D4 to enable placement of the bead cores. Diameter D4 may be, e.g., substantially equal to diameter D2, illustrated in FIG. 2. In accordance with the present invention, the carcass may be compressed along with drum 1 by application of a vacuum. For example, in order to be able to withstand the unavoidable production tolerances without risk of reaching the point of being strained, a residual compression of 0.3 mm at most needs to be accepted on carcasses for passenger tires, hence about 1% of what was recommended in the prior known state of the art.

The mounted carcass, which is reduced to a smaller inside diameter D4, has a largest diameter $DK_{max}$ over shoulder inflation profiles 12. Unless left bead core 11l was placed in an intermediate area near the drum bearing prior to construction of the carcass, diameter D4 of building drum 1 must be made small enough so that $DK_{max}$ becomes smaller than the inside diameter d of bead core 11. In this manner, left bead core 11l could be guided around building drum 1 without touching shoulder inflation profile 12.

However, if left bead core 11l was positioned in the intermediate area near the drum bearing, it is not necessary that the bead cores 11, in particular the left bead cores 11l, be guided over the axial extent E of building drum 1. That is, it is only necessary to move core beads 11 the distance shown by drum areas A (shown in FIG. 6). In this manner, shoulder inflation profiles 12 with their maximum diameter $DK_{max}$ are positioned outside the drum areas A that are still to be traversed by bead cores 11, and a maximum carcass diameter DK, which is smaller than $DK_{max}$, can be utilized at least in drum areas A. Thus, the difference between D3 and D4 does not need to be very large.

The latter embodiment ensures that the gaps 13 to be bridged by casing 3, i.e., between metallic segments 2, will not be too large. Further, by compressing the diameter to D4, which is smaller than D3, a slightly tighter position of the stress supports, i.e., underneath the region in which the bead cores 11 are to be mounted, can be selected without the stress supports being compressed in the peripheral direction. This compression of the stress supports in the peripheral direction, in particular with metallic stress supports, should be avoided.

Figure 6:
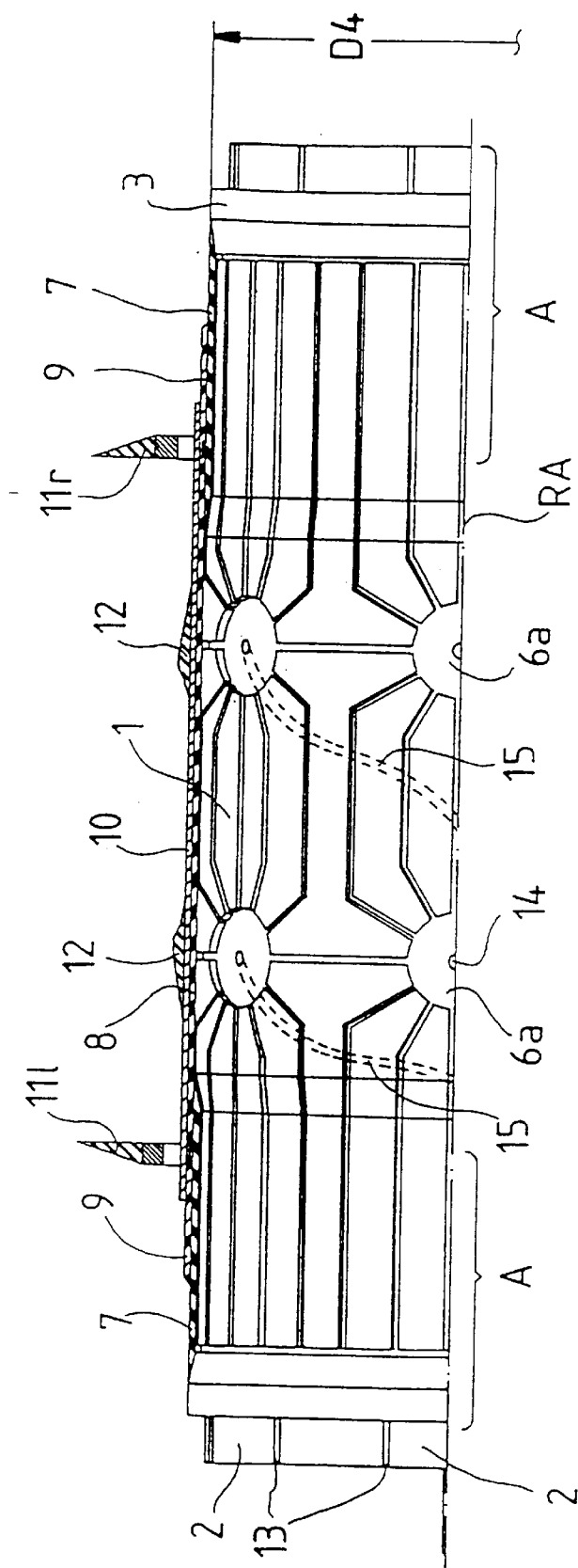
FIG. 6 illustrates a view similar to that depicted in FIG. 5 after the axial positioning of the bead cores.

FIG. 6 shows a view like FIG. 5, but according to the axially correct positioning, that is, the first part of the core placement. For this purpose, the cores are displaced axially towards the inside. So as not to diverge from what is essential, the conventionally constructed, displaceable holding devices for the cores are not shown in any of the subsequent figures.

Figure 7:
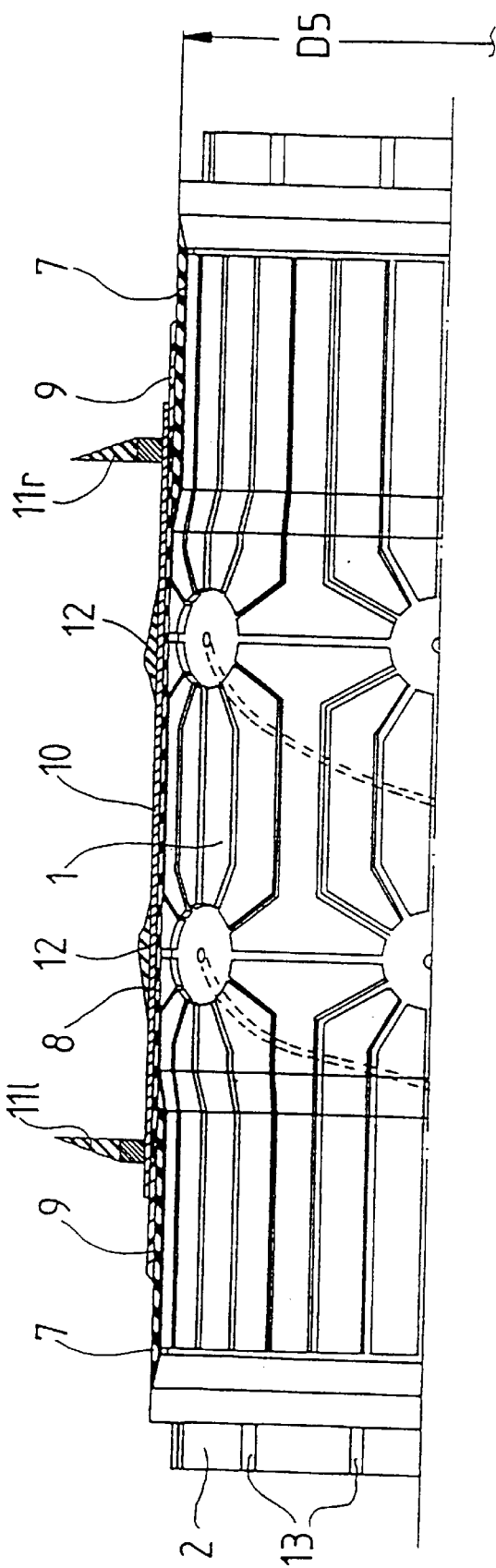
FIG. 7 illustrates a view similar to that depicted in FIG. 6 after expansion of the drum to a larger diameter for bonding the carcass and the bead cores.

FIG. 7 illustrates a view similar to that depicted in FIG. 6 after expanding building drum 1 to a diameter represented by D5, which is large enough to exert compression force sufficient to provide bonding between carcass ply 10 and bead cores 11. In accordance with the illustrated embodiment, diameter D5 may be substantially the same as diameter D3.

Figure 8:
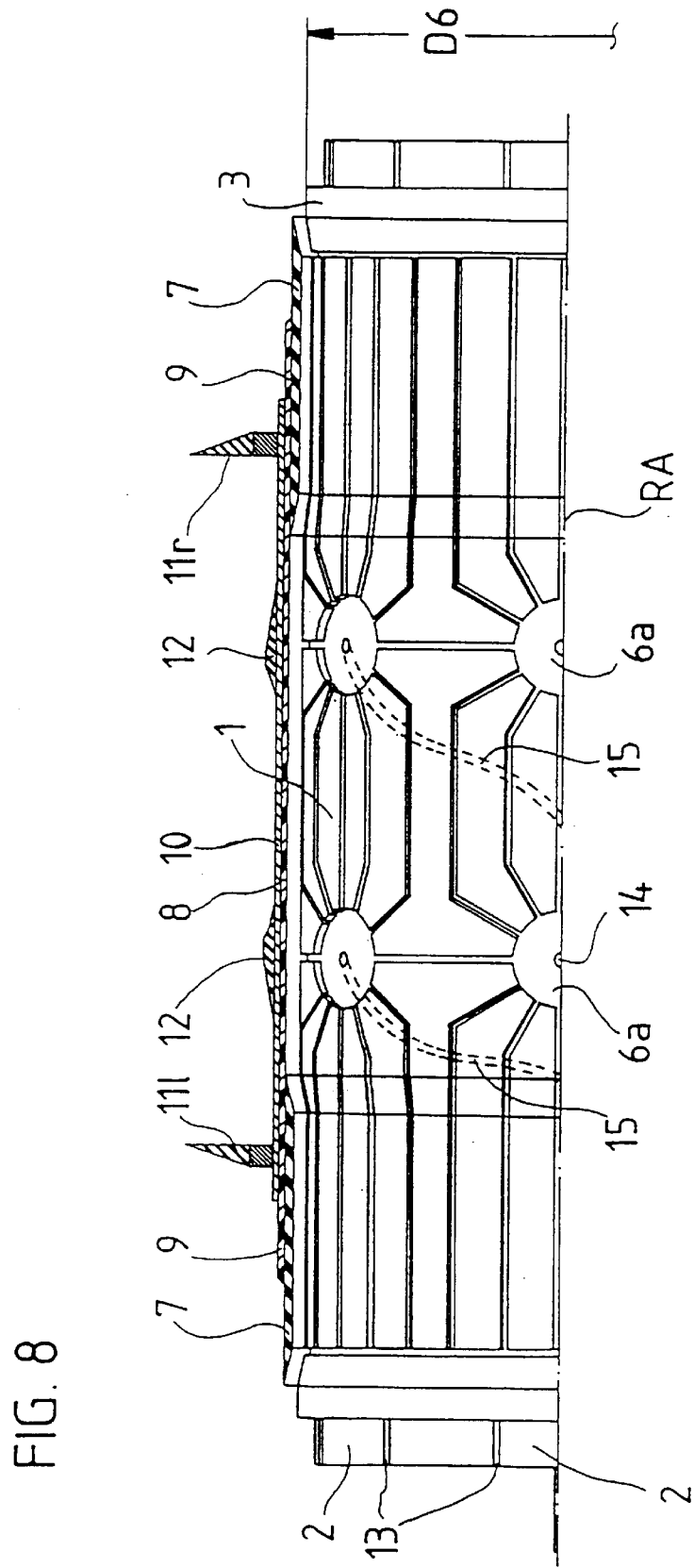
FIG. 8 illustrates a view similar to that depicted in FIG. 7 after contraction to a smaller diameter.
Figure 9:
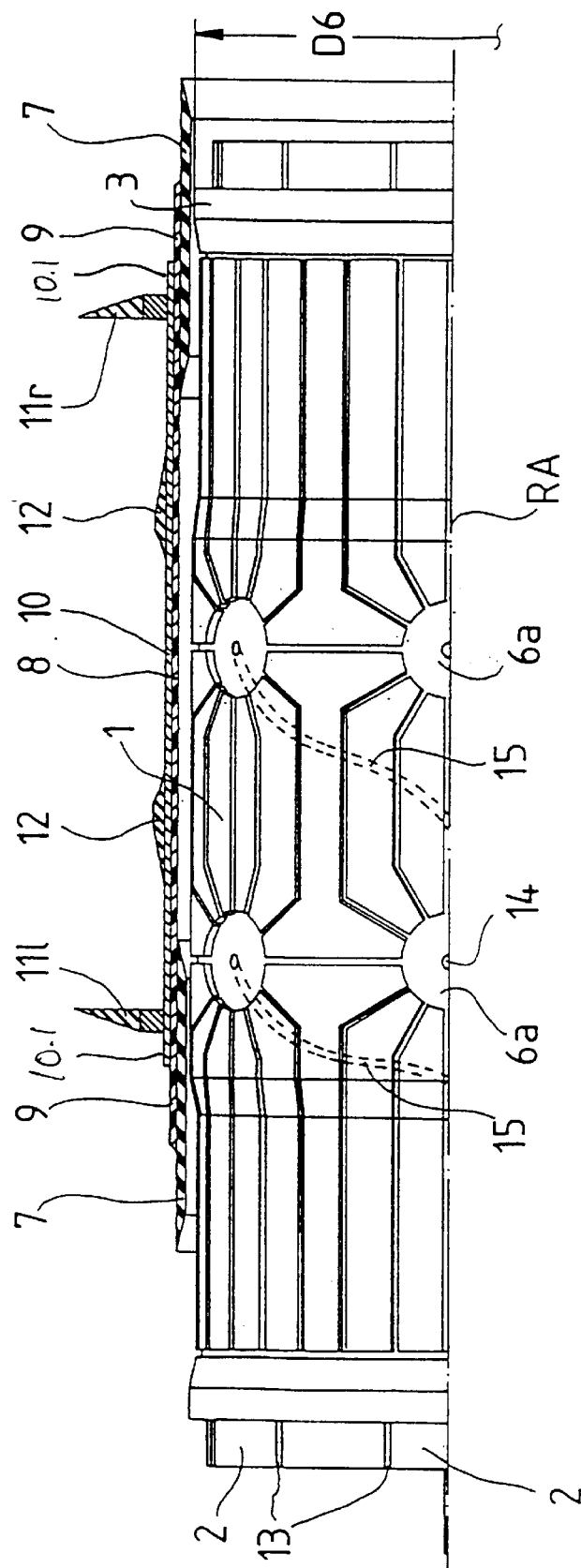
FIG. 9 illustrates a view similar to that depicted in FIG. 8 during removal of the carcass that has been formed in accordance with the present invention.

FIG. 8 illustrates a view similar to that depicted in FIG. 7 after compression of building drum 1 to a smaller diameter represented by D6. In accordance with the illustrated embodiment, diameter D6 is substantially the same as diameter D2. In this tight drum position, the completed carcass can be pulled off the drum, e.g., toward the right side, as illustrated in FIG. 9. After pulling the carcass off building drum 1 the construction of the next carcass may be started on building drum 1.

The semifinished carcass may be conveyed or moved to a preshaping device where edges 10.1 of carcass ply 10, which project axially outwardly across bead cores 11, may be turned up radially toward the outside, and, e.g., at the same time, the carcass area between bead cores 11 may be expanded radially outwardly. At the same time, a fixed gallows forms, in a known manner, a secure bracing of carcass ply 10 against bead cores 11 in the later completed tire.

Because the carcass treatment on the preshaping device, as well as further procedure for producing a green tire, e.g., applying belt plies, if necessary, and tread, are known in the art, a figure has not been devoted to this process. Similarly, no figure has been presented to depict the vulcanization concluding the tire manufacture in a vulcanization press impressing the tread pattern.

A benefit of the process of the present invention is that the semifinished carcass, during its conveyance from the building drum to the preshaping device and to possible temporary storage, is completely free from internal stress that can minimize precision-reducing stress equalization. This benefit arises because diameter D5, to which the carcass is expanded to when bonding to the inside of the bead cores, is at least substantially, and preferably the same as diameter D3 that was utilized to construct the carcass. To be able to axially position the bead cores in the meantime, the carcass may be compressed to a smaller diameter D4 by compressing the building drum and by applying a vacuum. As a result, the tires produced with this type of carcass have excellent concentricity.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

| Reference Numerals and Terminology | |
|---|---|
| 1 | Drum; |
| 2 | Metal segments of drum 1; |
| 3 | Casing of the drum 1; |

| Reference Numerals and Terminology | |
|---|---|
| 4 | Drum periphery; |
| 5 | Evacuating pump; |
| 6 | Voids in the drum casing 3; |
| | 6a Gullies; |
| | 6b Essentially transversely running voids; |
| | 6c Voids running from gully to gully in peripheral direction; |
| | 6d Voids on edges running in peripheral direction; |
| 7 | Strips; sidewall; |
| 8 | Inner liner; |
| 9 | Chafer; |
| 10 | Carcass ply; |
| | 10.1 Edges of the carcass ply 10 projecting axially outside the bead cores 11; |
| 11 | Bead cores; |
| | 11l left bead core; |
| | 11r right bead core; |
| 12 | Shoulder cushion profile; |
| 13 | Gaps between the segments 2 in the expanded drum condition; |
| 14 | Lead aperture (also called connecting hole) in the segments 2 for extraction by suction; |
| 15 | Tube lines for connecting the connecting holes 14 with the evacuating pump 5; |
| d | Inside diameter of the bead cores 11; |
| A | Axial end areas of the drum periphery to be traversed by bead cores 11 in the course of positioning the bead cores; |
| D0 | Smallest possible diameter of the building drum 1, i.e., in a contracted or collapsed state, measured across its metal segments 2 (for mounting the casing 3); |
| D1 | Unexpanded outside diameter of the casing 3 (during mounting of casing 3); |
| D2 | (D2 > D1) smallest diameter of the drum 1 in area A, which is set during the process (for the conveyance and positioning of the bead cores); |
| D3 | (D3 > D2) diameter of the drum 1 on which the carcass is constructed according to the invention until the cores 11 are set; |
| D4 | Diameter to which the drum 1 then is compressed for setting the bead cores 11, preferably D4 = D2; |
| D5 | Diameter to which the drum 1 then is expanded—that is, widened—for the bonding of the bead cores 11 by compression, preferably D5 = D3; |
| D6 | Diameter of the drum 1 for pulling off the carcass 10 (according to the invention preferably D6 = D2); |
| DK | Outside diameter of the carcass in the areas A while setting its inside diameter to D4; refer to Fig. 5 there to be measured over the carcass ply 10; |
| $DK_{max}$ | Maximum outside diameter of the carcass while adjusting the inside diameter to D4; refer to Fig. 5, for measuring via the shoulder inflation profiles 12; |
| E | The part of the axial expansion of drum 1 which later is traversed during movement of the bead core; and |
| RA | Axis of rotation. |

What is claimed is:

1. A process for constructing a green tire on a radially expandable drum including a plurality of metal segments, said metal segments being contractible to a first diameter D0, the drum having a substantially horizontal axis of rotation, and a casing mountable on the metal segments at said first diameter and extending across the metal segments, the casing being formed of an elastic material and having an inner diameter, measured in a relaxed state, at least as great as said first diameter D0, and said drum further includes a plurality of voids coupled to an evacuation pump;

the process comprising:
bringing the expandable drum to a second diameter D3 measured across the casing whereby the second diameter D3 is greater than the sum D1 of said first diameter D0 plus twice the thickness of said casing,
producing a carcass on the drum periphery at second diameter D3, the carcass comprising at least one of sidewalls and an air-tight inner layer, and further comprising at least one carcass ply;
generating a vacuum in the voids to suction the carcass onto the drum periphery;

radially contracting at least axial end areas of the expandable drum to a third diameter D4 to enable bead cores to traverse the drum periphery without touching the drum periphery;

sliding the bead cores over at least the axial end areas of the drum periphery and axially positioning the bead cores over the axial end areas of the drum periphery;

radially expanding at least the axial end areas of the radially expandable drum to a fourth diameter D5 sufficient to radially press the carcass against the inner side of the bead cores to provide adequate bonding between an inner surface of the bead cores and an external surface of the carcass, said fourth diameter D5 being substantially the same as the second diameter D3;

radially contracting the radially expandable drum to a fifth diameter D6 that is smaller than said second diameter D3 but greater than the sum D1 of said first diameter D0 plus twice the thickness of said casing, and pulling the carcass with set bead cores off the radially expandable drum for further processing in a preshaping device, wherein, upon conclusion of the bead core placement, the carcass is substantially free of internal compressive stress and internal tensile stress.

2. The process in accordance with claim 1, wherein the axial end areas of the drum periphery extend from the axially external drum edge to an internal axial side of the bead core.

3. The process in accordance with claim 1, wherein the entire expandable drum is contracted and expanded with the contraction and expansion of the axial end areas of the drum periphery.

4. The process in accordance with claim 1, wherein the generated vacuum in the voids is a minimum of an approximately 30% vacuum.

5. The process in accordance with claim 1, wherein the generated vacuum in the voids is between approximately a 55% and 80% vacuum.

6. The process in accordance with claim 1, wherein the vacuum generated in the voids is sufficient to suction the carcass onto the expandable drum such that, during subsequent contraction of the drum diameter, the carcass is held substantially free of wrinkles and waves.

7. The process in accordance with claim 1, further comprising:

bringing the expandable drum to a sixth diameter (D2) in the beginning of said process, said sixth diameter being less than an inner diameter of the bead cores;

sliding a bead core from a free end of the expandable drum and over the expandable drum to a bearing end of the expandable drum; and storing said bead core until the bead core is to be axially positioned and set on the carcass.

8. The process in accordance with claim 7, the fifth and sixth diameters being substantially the same.

9. The process in accordance with claim 1, wherein the bead cores are prefabricated prior to the construction process for the green tire.

10. The process in accordance with claim 9, the bead cores being composed of one of Pierce cores for a motor vehicle tire and hexagonal cores for a truck tire.

11. The process in accordance with claim 1, the elastic material of the casing comprising rubber.

12. The process in accordance with claim 1, the elastic material having a thickness sufficient to provide equalized compression of the carcass material against the inner surface of the bead cores.

13. The process in accordance with claim 1, wherein the third diameter D4 is greater than the sum D1 of said first diameter D0 plus twice the thickness of said casing and less than the second diameter D3.

14. The process in accordance with claim 1, wherein the fifth diameter D6 is greater than the sum D1 of said first diameter D0 plus twice the thickness of said casing and less than the second diameter D3.

* * * * *